(12) United States Patent
Wu (10) Patent No.: US 8,534,870 B2
(45) Date of Patent: Sep. 17, 2013

(54) ROTATABLE LIGHT SOURCE DEVICE

(75) Inventor: Chun-Che Wu, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 444 days.

(21) Appl. No.: 13/009,682

(22) Filed: Jan. 19, 2011

(65) Prior Publication Data

US 2012/0119994 A1  May 17, 2012

(30) Foreign Application Priority Data

Nov. 12, 2010 (TW) .................................. 99138925 A (51) Int. Cl.
*F21V 21/00* (2006.01)
(52) U.S. Cl.
USPC . 362/249.03; 345/156; 345/166; 362/249.05; 362/269; 362/287

(58) Field of Classification Search
USPC .................... 345/156, 166; 362/247, 249.02, 362/249.03, 249.05, 269, 285, 287
See application file for complete search history.

(56) References Cited

U.S. PATENT DOCUMENTS

2012/0055763 A1* 3/2012 Chou .............................. 200/4

* cited by examiner

*Primary Examiner* — Stephen F Husar
(74) *Attorney, Agent, or Firm* — Kirton McConkie; Evan R. Witt (57) ABSTRACT

A rotatable light source device includes an upper cover, a circuit board, plural light-emitting elements and a base. The circuit board is disposed under the upper cover, and connected with the upper cover. The light-emitting elements are mounted on the circuit board. One of the light-emitting elements is electrically connected to a power source to illuminate. The base includes a receptacle for accommodating the upper cover and the circuit board. By rotating the upper cover and the circuit board with respect to the base, another of the light-emitting elements is electrically connected to the power source to illuminate.

14 Claims, 6 Drawing Sheets

ROTATABLE LIGHT SOURCE DEVICE

FIELD OF THE INVENTION

The present invention relates to a light source device, and more particularly to a rotatable light source device.

BACKGROUND OF THE INVENTION

Recently, for strengthening human's visual sensation, the light sources within electronic devices are used as design fundamentals. For example, a light-transmissible mouse is disclosed in Taiwanese Utility Patent No. M361671. The light-transmissible mouse comprises a transparent upper cover and a light source module. The light source module is disposed within the mouse for emitting light. The light passes through the transparent upper cover to the surroundings. Consequently, the appearance of the mouse is enriched. However, since the light emitted from the light source module has a single light color, the color appearance of the mouse is very monotonous and fails to meet many users' requirements. For solving this drawback, an electronic device capable of producing a light color selected by the user has been developed.

Figure 1:
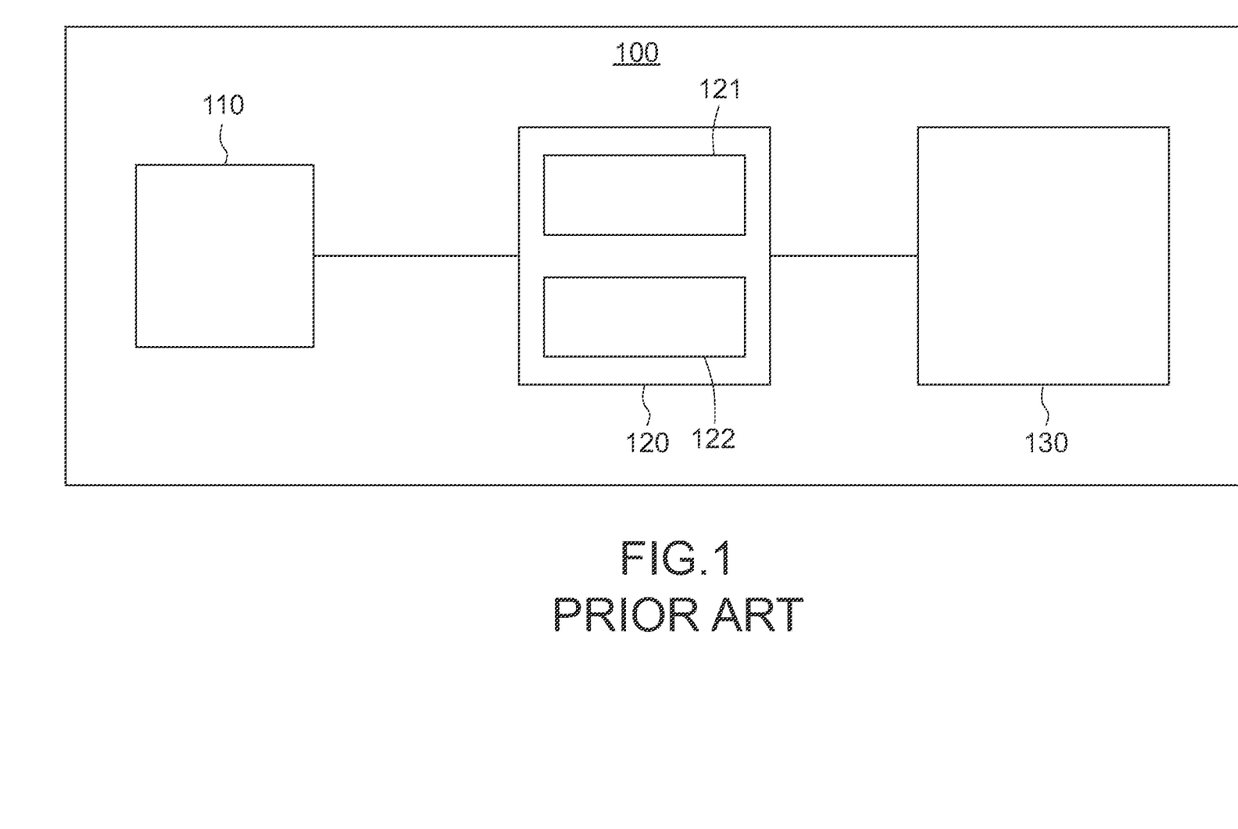
FIG. 1 is a schematic circuit block diagram illustrating a conventional light-emitting module, which is disclosed in Taiwanese Utility Patent No. M380500.

For example, an electronic device capable of producing changeable light colors is disclosed in Taiwanese Utility Patent No. M380500. A light-emitting module is disposed within the electronic device for emitting light with an adjustable light color. Please refer to FIG. 1. FIG. 1 is a schematic circuit block diagram illustrating a conventional light-emitting module, which is disclosed in Taiwanese Utility Patent No. M380500. The light-emitting module 100 comprises a color selection unit 110, a controlling unit 120 and a light-emitting unit 130. The controlling unit 120 comprises a microprocessor 121 and an analog-to-digital converter 122. The color selection unit 110 provides one or more colors to be selected by the user.

As shown in FIG. 1, the color selection unit 110 and the light-emitting unit 130 are electrically connected with the controlling unit 120. After a color is selected by the user through the color selection unit 110, a voltage signal is transmitted from the color selection unit 110 to the controlling unit 120. After the voltage signal is received by the microprocessor 121 of the controlling unit 120, the voltage signal is converted into an analog control signal by the microprocessor 121. By the analog-to-digital converter 122 of the controlling unit 120, the analog control signal is converted into a digital control signal. According to the digital control signal, the light-emitting unit 130 emits light corresponding to the voltage signal. In such way, the appearance of the electronic device exhibits the selected light color.

The conventional technology of changing the light color of the electronic device, however, still has some drawbacks. For example, for controlling the light-emitting unit 130 to produce various light colors, it is necessary to install the controlling unit 120 in the electronic device. Under this circumstance, the power consumption of the electronic device is high and the electronic device is not cost-effective.

SUMMARY OF THE INVENTION

The present invention provides a rotatable light source device with low fabricating cost.

The present invention also provides a rotatable light source device with low power consumption.

In accordance with an aspect of the present invention, there is provided a rotatable light source device. The rotatable light source device includes an upper cover, a circuit board, plural light-emitting elements and a base. The circuit board is disposed under the upper cover, and connected with the upper cover. The light-emitting elements are mounted on the circuit board. One of the light-emitting elements is electrically connected to a power source to illuminate. The base includes a receptacle for accommodating the upper cover and the circuit board. By rotating the upper cover and the circuit board with respect to the base, another of the light-emitting elements is electrically connected to the power source to illuminate.

In an embodiment, the light-emitting elements are light emitting diodes (LEDs).

In an embodiment, the light-emitting elements have at least two light colors.

In an embodiment, plural salient points are formed on an outer periphery of the upper cover, and plural indentations are formed in an inner periphery of the base. The salient points and the indentations are engaged with each other, thereby positioning the upper cover.

In an embodiment, the upper cover has a first shaft hole, and the circuit board has a second shaft hole.

In an embodiment, the light-emitting elements are discretely arranged around the second shaft hole of the circuit board.

In an embodiment, the first shaft hole is formed in a middle portion of the upper cover.

In an embodiment, the second shaft hole is formed in a middle portion of the circuit board.

In an embodiment, the rotatable light source device further includes a fixture member having a light-transmissible shaft. The light-transmissible shaft is penetrated through the first shaft hole of the upper cover and the second shaft hole of the circuit board. A reflector sheet is disposed under the light-transmissible shaft.

In an embodiment, the fixture member further includes two fixing arms. The fixing arms are protruded from an outer periphery of the light-transmissible shaft for connecting the base with the fixture member.

In an embodiment, the fixture member further includes a ring-shaped structure, which is sheathed around the light-transmissible shaft for connecting the base with the fixture member.

In an embodiment, the rotatable light source device further includes a switch, which is disposed under the reflector sheet.

In accordance with another aspect of the present invention, there is provided a computer input device using the rotatable light source device of the present invention.

In accordance with a further aspect of the present invention, there is provided a mouse using the rotatable light source device of the present invention.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
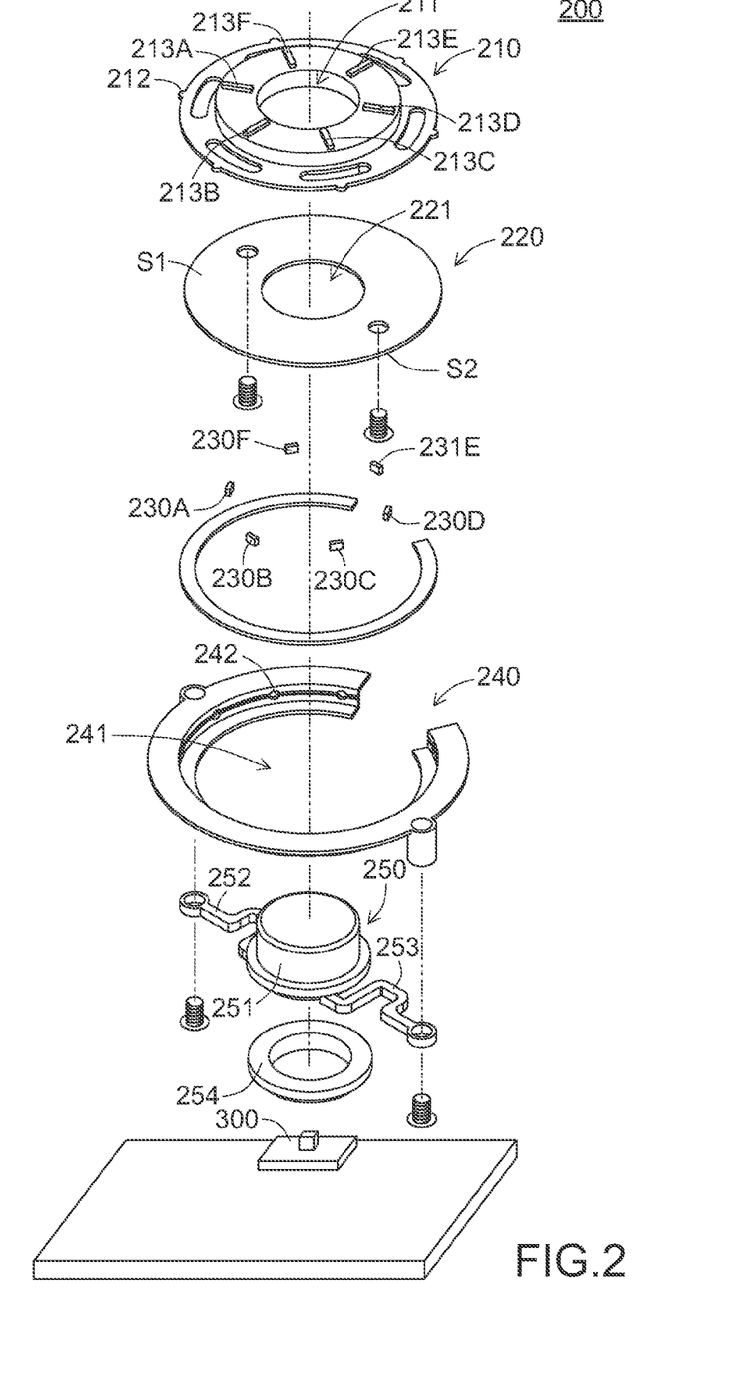
FIG. 2 is a schematic exploded view illustrating a rotatable light source device according to a first embodiment of the present invention.

FIG. 2 is a schematic exploded view illustrating a rotatable light source device according to a first embodiment of the present invention. As shown in FIG. 2, the rotatable light source device 200 comprises an upper cover 210, a circuit board 220, plural light-emitting elements 230A, 230B, 230C, 230D, 230E and 230F, a base 240, a fixture member 250 and a push switch 300. The circuit board 220 is disposed under the upper cover 210. The circuit board 220 has an upper surface S1 and a lower surface S2. The upper surface S1 of the circuit board 220 is connected with the upper cover 210. In addition, by means of screws, the upper surface S1 of the circuit board 220 is fixed on the upper cover 210. The light-emitting elements 230A~230F are mounted on the lower surface S2 of the circuit board 220.

The base 240 has a receptacle 241 for accommodating the upper cover 210 and the circuit board 220. The fixture member 250 comprises a light-transmissible shaft 251, two fixing arms 252 and 253, and a reflector sheet 254. The fixing arms 252 and 253 are disposed under the base 240, and respectively protruded from the outer periphery of the light-transmissible shaft 251 for connecting the base 240 with the fixture member 250. In addition, by means of screws, the fixing arms 252 and 253 are fixed on the base 240. The reflector sheet 254 is disposed under the light-transmissible shaft 251, and connected with the light-transmissible shaft 251 for reflecting the light that is emitted from the light-emitting elements 230A~230F. Consequently, the light can pass through the light-transmissible shaft 251 to the surroundings, and the light color can be observed by the user.

Figure 3:
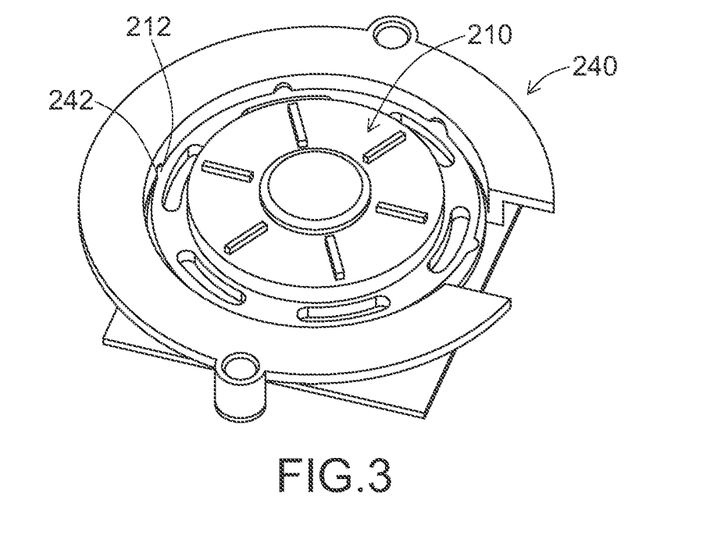
FIG. 3 is a schematic assembled view illustrating a rotatable light source device according to the first embodiment of the present invention.

Please refer to FIG. 2 again. A first shaft hole 211 is formed in the middle portion of the upper cover 210. A second shaft hole 221 is formed in the middle portion of the circuit board 220. The center of the first shaft hole 211 and the center of the second shaft hole 221 are arranged in the same line. Consequently, after the light-transmissible shaft 251 of the fixture member 250 is penetrated through the first shaft hole 211 and the second shaft hole 221, the upper cover 210 and the circuit board 220 are rotatable with respect to the base 240 through the light-transmissible shaft 251. Moreover, plural salient points 212 are formed on the outer periphery of the upper cover 210. In addition, plural indentations 242 are formed in the inner periphery of the base 240. When the upper cover 210 and the circuit board 220 are rotated with respect to the base 240, the salient points 212 of the upper cover 210 and the indentations 242 of the base 240 are engaged with each other, thereby positioning the upper cover 210. In such way, the upper cover 210 may be rotated to a specified position quickly and precisely. The assembled structure of the rotatable light source device of FIG. 2 is shown in FIG. 3.

Figure 4:
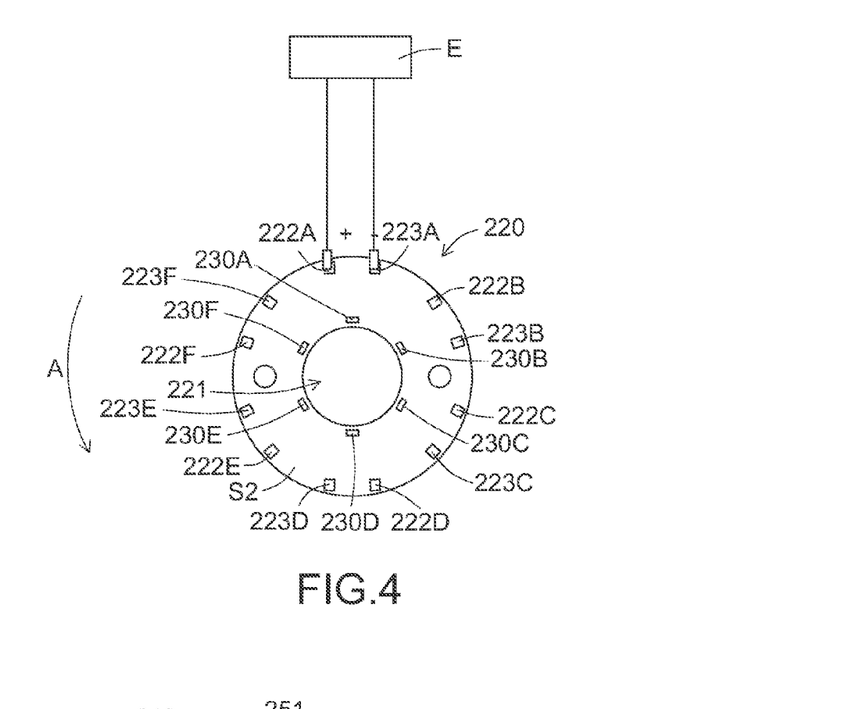
FIG. 4 is a schematic view illustrating the circuit board of the rotatable light source device according to the present invention.

Please refer to FIG. 4. FIG. 4 is a schematic view illustrating the circuit board of the rotatable light source device according to the present invention. As shown in FIG. 4, the plural light-emitting elements 230A~230F, plural positive electrode contacts 222A, 222B, 222C, 222D, 222E and 222F, and plural negative electrode contacts 223A, 223B, 223C, 223D, 223E and 223F are disposed on the lower surface S2 of the circuit board 220. In this embodiment, the light-emitting elements 230A~230F are light emitting diodes for respectively emitting light with different colors. Moreover specially, the light-emitting elements 230A~230F are surface mount device light emitting diodes (SMD LEDs), which are small in volume. For example, the light-emitting elements 230A~230F are light emitting diodes for respectively emitting light with white, blue, purple, yellow, green and red colors. The light-emitting elements 230A~230F are discretely arranged around the second shaft hole 221 of the circuit board 220 for facilitating the light to pass through the light-transmissible shaft 251, which is penetrated through the second shaft hole 221.

In addition, the plural positive electrode contacts 222A~222F and the plural negative electrode contacts 223A~223F mounted on the circuit board 220 are selectively connected with a power source E, so that electricity can be transmitted from the power source E to a selected one of the plural light-emitting elements 230A~230F. An example of the power source E is a battery. Alternatively, in a case that the rotatable light source device is installed in an electronic device, the power source E is the power source of the electronic device itself. Each of the light-emitting elements 230A~230F is electrically connected with a corresponding positive electrode contact and a corresponding negative electrode contact. For example, as shown in FIG. 4, the positive electrode contact 222A and the negative electrode contact 223A are electrically connected with the light-emitting element 230A; and the positive electrode contact 222B and the negative electrode contact 223B are electrically connected with the light-emitting element 230B.

As shown in FIG. 4, by rotating the upper cover 210 in the direction A, the circuit board 210 that is connected with the upper cover 210 is also rotated in the direction A. Consequently, the relative locations between the light-emitting elements 230A~230F, the positive electrode contacts 222A~222F and the plural negative electrode contacts 223A~223F are changed. Please refer to FIG. 4. Originally, the power source E is electrically connected with the positive electrode contact 222A and the negative electrode contact 223A. As the upper cover 210 is rotated in the direction A, the power source E is switched to be electrically connected with the positive electrode contact 222B and the negative electrode contact 223B to power the light-emitting element 230B to illuminate. In this embodiment, the light-emitting element 230A is a white light emitting diode, and the light-emitting element 230B is a blue light emitting diode. That is, when the upper cover 210 is rotated in the direction A to drive illumination of the light-emitting element 230B, the light color of the light passing through the light-transmissible shaft 251 is switched from white to blue. In such way, the light color may be selected according to the user's requirements. Similarly, when the upper cover 210 is rotated in a direction opposed to the direction A, the light color of the light passing through the light-transmissible shaft 251 is switched from blue to white.

Please refer to FIG. 2 again. There are plural colored marks 213A, 213B, 213C, 213D, 213E and 213F on the upper cover 210 corresponding to the locations of the plural light-emitting elements 230A~230F. These colored marks 213A~213F are used for indicating the light colors of the plural light-emitting elements 230A~230F, respectively. In this embodiment, the light-emitting element 230A is a white light emitting diode. Correspondingly, the colored mark 213A is a white color block or a character "White". Through the colored marks, the user may realize the relationship between the rotating locations and the light colors in order to select a desired light color.

The above embodiment is illustrated by referring to the rotatable light source device 200 with six light-emitting elements 230A~230F. It is noted that the number of light-emitting elements may be varied according to the practical requirements. In the above embodiment, the light-emitting elements 230A~230F are light emitting diodes for respectively emitting light with different colors. Alternatively, in some embodiments, some of the light-emitting elements 230A~230F may emit light with the same color. For example, the light-emitting elements 230A and 230D are white light emitting diodes, the light-emitting elements 230B and 230E are blue light emitting diodes, and the light-emitting elements 230C and 230F are purple light emitting diodes. For facilitating to quickly switch these three light colors, the light emitting diodes of the same colors are diagonally arranged on the circuit board 220.

Figure 5:
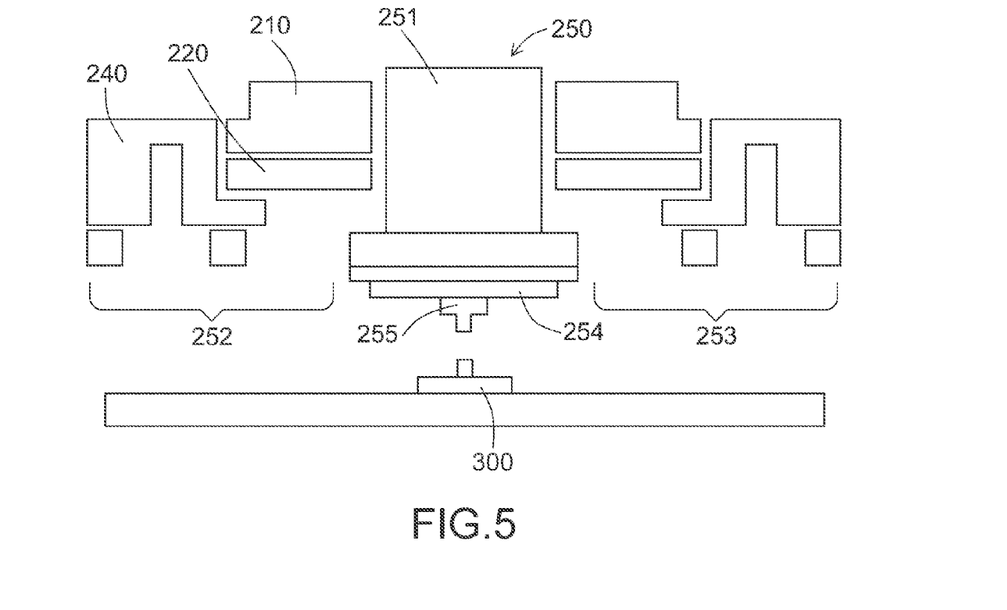
FIG. 5 is a schematic cross-sectional view illustrating the rotatable light source device according to the first embodiment of the present invention.

Please refer to FIG. 2 again. The fixing arms 252 and 253 are flexible structures. Since the action lengths of the flexible structures are relatively long, elasticity is imparted to the fixing arms 252 and 253. Under this circumstance, the fixture member 250 is depressible. Moreover, as shown in FIG. 5, the reflector sheet 254 further comprises a protrusion 255 to trigger the push switch 300, which is arranged under the reflector sheet 254. Please refer to FIGS. 2 and 5 again. FIG. 5 is a schematic cross-sectional view illustrating the rotatable light source device according to the first embodiment of the present invention. When the light-transmissible shaft 251 is depressed, the elasticity offered by the fixing arms 252 and 253 causes a tiny downward shift of the light-transmissible shaft 251. Correspondingly, the push switch 300 is touched by the protrusion 255 of the reflector sheet 254. In such way, the functions of the rotatable light source device 200 are enhanced.

Figure 6:
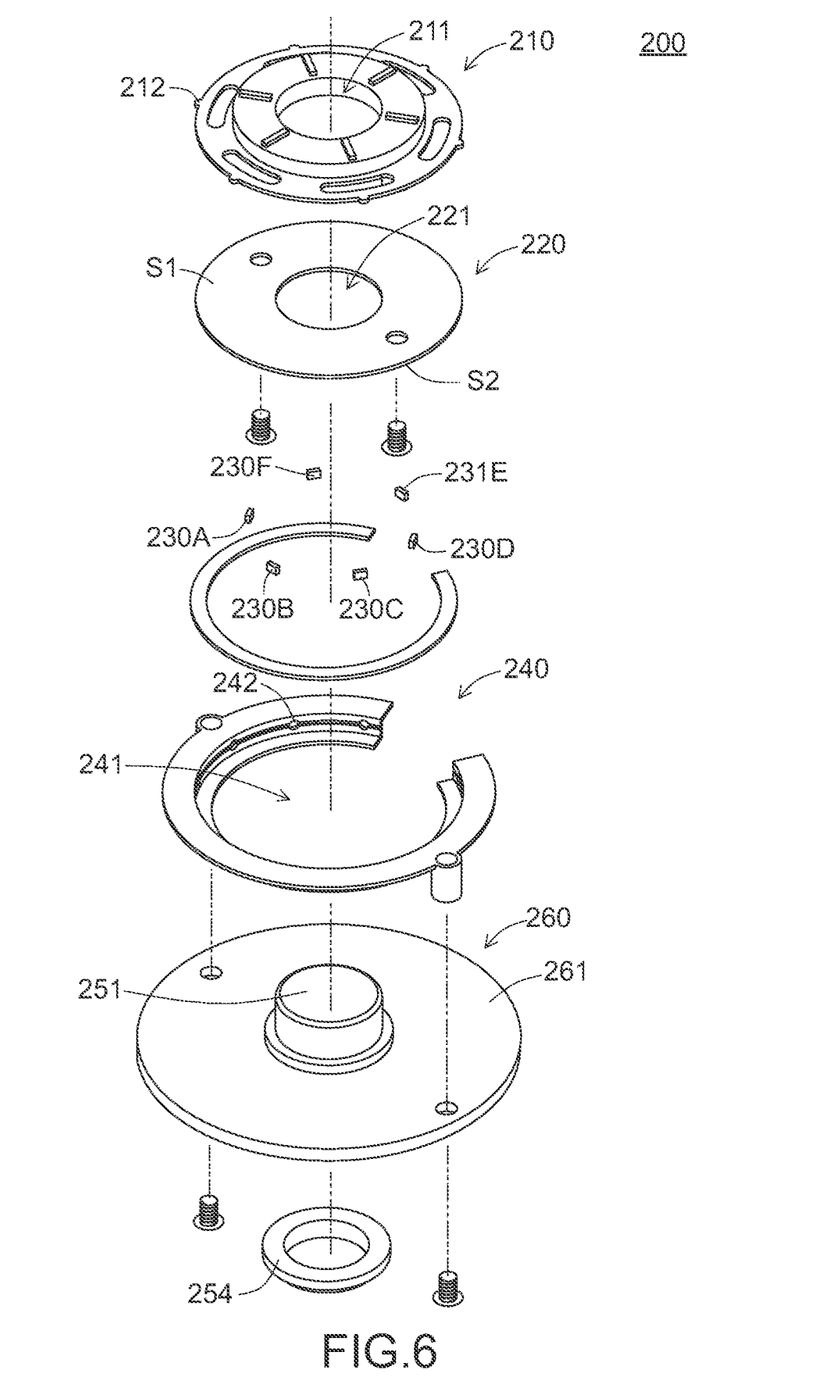
FIG. 6 is a schematic exploded view illustrating a rotatable light source device according to a second embodiment of the present invention.

Hereinafter, a second embodiment of the present invention will be illustrated with reference to FIG. 6. FIG. 6 is a schematic exploded view illustrating a rotatable light source device according to a second embodiment of the present invention. As shown in FIG. 6, the rotatable light source device 200 comprises an upper cover 210, a circuit board 220, plural light-emitting elements 230A~230F, a base 240 and a fixture member 260. The circuit board 220 is disposed under the upper cover 210. The base 240 has a receptacle 241 for accommodating the upper cover 210 and the circuit board 220.

Except that the fixture member 260 of FIG. 6 is different from the fixture member 250 of FIG. 2 and no push switch is included in the embodiment of FIG. 6, the configurations of the rotatable light source device of the second embodiment (see FIG. 6) are substantially identical to those of the rotatable light source device of the first embodiment (see FIG. 2), and are not redundantly described herein. In addition to the light-transmissible shaft 251 and the reflector sheet 254 as shown in FIG. 2, the fixture member 260 of FIG. 6 further includes a ring-shaped structure 261. The ring-shaped structure 261 is sheathed around the light-transmissible shaft 251, and arranged under to the base 240. Through the ring-shaped structure 261, the fixture member 260 and the base 240 can be securely combined together.

The rotatable light source device of the present invention may be applied to various electronic devices such as computer input devices, multimedia players or handheld communication devices. Hereinafter, the present invention will be illustrated by referring to a computer input device (especially a mouse) with the rotatable light source device.

Figure 7:
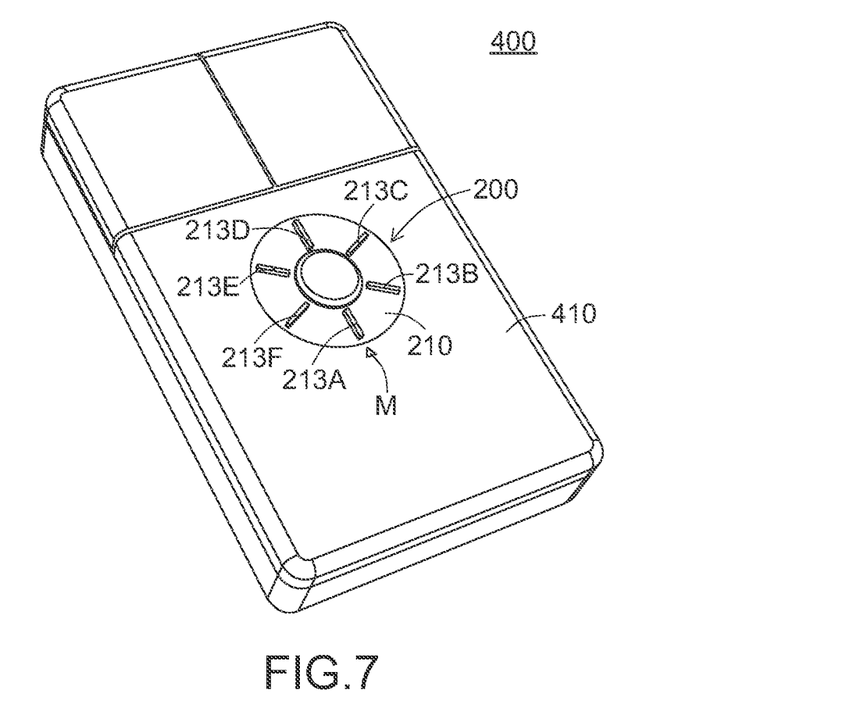
FIG. 7 is a schematic perspective view illustrating a mouse with a rotatable light source device of the present invention.

Please refer to FIG. 7. FIG. 7 is a schematic perspective view illustrating a mouse with a rotatable light source device of the present invention. The mouse 400 comprises a casing 410 and a rotatable light source device 200. The rotatable light source device 200 is installed on the casing 410 for prompting the user what the current action of the computer is. For example, when a new electronic mail is received, the rotatable light source device 200 may illuminate to prompt the user. Moreover, plural colored marks 213A~213F are formed on the upper cover 210 for indicating the light colors of corresponding light-emitting elements. Moreover, an arrowed symbol M is printed on the casing 410 to prompt the user where the power source E is located. In a case that a specified colored mark is pointed to the arrowed symbol M, a corresponding light-emitting element is enabled to produce light with a corresponding color. For example, if the colored mark 213A is pointed to the arrowed symbol M, the light-emitting element 230A corresponding to the colored mark 213A is enabled to produce white light. If the upper cover 210 of the rotatable light source device 200 is rotated to have the colored mark 213B point to the arrowed symbol M, the light-emitting element 230B corresponding to the colored mark 213B is enabled to produce blue light. The blue light will pass through the light-transmissible shaft 251 to the surroundings, so that the light color is observed by the user. In such way, the rotatable light source device 200 can meet the user's requirements.

From the above description, by rotating the upper cover 210 to drive another light-emitting element to illuminate, the rotatable light source device 200 of the present invention is capable producing light with a changeable color without the need of installing an additional controlling unit. Consequently, the light color may be selected according to the user's requirements. Moreover, since the controlling unit is omitted, the fabricating cost and the power consumption of the rotatable light source device 200 of the present invention will be reduced, and the competitiveness of the electronic device in the market will be enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rotatable light source device, comprising:
   an upper cover;
   a circuit board disposed under said upper cover, and connected with said upper cover;
   plural light-emitting elements mounted on said circuit board, wherein one of said light-emitting elements is electrically connected to a power source to illuminate; and
   a base comprising a receptacle for accommodating said upper cover and said circuit board, wherein by rotating said upper cover and said circuit board with respect to said base, another of said light-emitting elements is electrically connected to said power source to illuminate.

2. The rotatable light source device according to claim 1 wherein said light-emitting elements are light emitting diodes (LEDs).

3. The rotatable light source device according to claim 1 wherein said light-emitting elements have at least two light colors.

4. The rotatable light source device according to claim 1 wherein plural salient points are formed on an outer periphery of said upper cover, and plural indentations are formed in an inner periphery of said base, wherein said salient points and said indentations are engaged with each other, thereby positioning said upper cover.

5. The rotatable light source device according to claim 1 wherein said upper cover has a first shaft hole, and said circuit board has a second shaft hole.

6. The rotatable light source device according to claim 5 wherein said light-emitting elements are discretely arranged around said second shaft hole of said circuit board.

7. The rotatable light source device according to claim 5 wherein said first shaft hole is formed in a middle portion of said upper cover.

8. The rotatable light source device according to claim 5 wherein said second shaft hole is formed in a middle portion of said circuit board.

9. The rotatable light source device according to claim 5 wherein said rotatable light source device further comprises a fixture member having a light-transmissible shaft, wherein said light-transmissible shaft is penetrated through said first shaft hole of said upper cover and said second shaft hole of said circuit board, and a reflector sheet is disposed under said light-transmissible shaft.

10. The rotatable light source device according to claim 9 wherein said fixture member further comprises two fixing arms, wherein said fixing arms are protruded from an outer periphery of said light-transmissible shaft for connecting said base with said fixture member.

11. The rotatable light source device according to claim 9 wherein said fixture member further comprises a ring-shaped structure, which is sheathed around said light-transmissible shaft for connecting said base with said fixture member.

12. The rotatable light source device according to claim 9 wherein said rotatable light source device further comprises a switch, which is disposed under said reflector sheet.

13. A computer input device using said rotatable light source device according to claim 1.

14. A mouse using said rotatable light source device according to claim 1.

* * * * *